United States Patent [19]

Hidaka

[11] 3,751,170

[45] Aug. 7, 1973

[54] METHOD AND APPARATUS FOR POSITIONING BODIES RELATIVE TO EACH OTHER

[75] Inventor: Tsuneo Hidaka, Niiza, Japan

[73] Assignee: Asahi Kogaku Kogyo Kabushiki Kaisha, Tokyo-to, Japan

[22] Filed: Mar. 6, 1972

[21] Appl. No.: 232,054

[30] Foreign Application Priority Data

Mar. 11, 1971 Japan .............................. 46/12815

[52] U.S. Cl. ..................... 356/172, 350/30, 350/81, 356/168

[51] Int. Cl. ...................... G01b 11/26, G01b 11/24

[58] Field of Search .................... 356/172, 166, 168, 356/170, 171; 350/30, 81

[56] References Cited

UNITED STATES PATENTS 3,671,125 6/1972 Matveevich et al. ............... 356/172

*Primary Examiner*—Ronald L. Wibert
*Assistant Examiner*—V. P. McGraw
*Attorney*—Harold D. Steinberg

[57] ABSTRACT

A method and apparatus for positioning with respect to each other a pair of bodies such as a mask having a predetermined pattern thereon and a wafer onto which the pattern is to be printed. These bodies are respectively situated in parallel focal planes and a reference point on the body in one focal plane has an image thereof projected onto the body in the second focal plane, this latter body having a positioning point which is to coincide with this image when the bodies are properly positioned with respect to each other. A second image of the reference point is projected to an observation point, and an image of the image of the reference point on the body at the second focal plane is also projected to the observation point, so that the operator may observe at the observation point when the positioning point is located in coincidence with the image of the reference point on the body at the second focal plane.

12 Claims, 4 Drawing Figures

METHOD AND APPARATUS FOR POSITIONING BODIES RELATIVE TO EACH OTHER

BACKGROUND OF THE INVENTION

The present invention relates to the positioning of bodies with respect to each other.

Thus, the present invention is particularly adapted for optically reproducing at the photosensitive surface of one body a pattern which is carried by another body. In order to carry out these operations the bodies must be very precisely positioned with respect to each other.

Thus, it is known that minute patterns such as integrated circuits may be printed on a substrate, in the form of a silicon wafer, for example, by preliminarily forming the desired pattern usually on a silver salt dry-plate or the like and then subjecting to exposure a substrate which is coated with a photo-resisting material and which closely adheres to the dry-plate. Positioning of the plate and substrate according to this method, which is a contact-type of exposure system, is brought about by way of an optical microscope.

In contrast with this contact exposure system, there have been recent developments in an optical projection exposure system. The present invention relates to this latter type of system and in particular to a method and apparatus for positioning bodies with respect to each other so that minute pattern printing can be carried out with this type of projection exposure system.

However, the present invention is applicable not only to printing of integrated circuits but also to positioning in general with an apparatus utilizing a projection exposure system. The invention is, however, disclosed below by way of example, in connection with projection of an integrated circuit, and although in the example described below the projection magnification is 1X, the latter degree of magnification is not essential.

Lenses used in projection exposure systems of this type most often require a wide field of view and a high degree of resolution. Therefore, it is preferred to reduce the aberration of such lenses to a sufficient extent by utilizing light rays of specific wave lengths. The particular wave length used is generally one which will be effectively sensed by the photo-resisting material at the base on which the pattern is to be reproduced, this wave length being, for example, *g* line which is a line spectrum of a mercury lamp, the wave length being 4,358 A. It is also necessary to use for positioning purposes a wave length of a visual light ray which is not sensed by the photo-resisting material. For example, for this purpose the *e* line of another line spectrum of a mercury lamp is used, this wave length being 5,461 A.

Experience has shown that it is extremely difficult to design a lens which has the required characteristics of a high degree of resolution and a wide field of view and which further is capable of having its aberration compensated by two wave lengths such as the *g* line and *e* line, as referred to above.

SUMMARY OF THE INVENTION

It is accordingly a primary object of the present invention to provide a method and apparatus which will avoid the above drawbacks.

In particular, it is an object of the present invention to provide a method for positioning bodies in such a way that the highest degree of accuracy in their relative positioning can be achieved while at the same time, instead of requiring aberration compensation by two wave lengths, compensation by only one wave length is required.

It is also an object of the present invention to provide a method and apparatus for facilitating accuracy of positioning by making it possible for the operator to align elements which have different colors, so that they are readily and unmistakably observed.

In addition, it is an object of the present invention to provide a method and apparatus of the above type which make it possible to greatly simplify the design of a projector lens.

Furthermore, it is an object of the present invention to provide a positioning method which is exceedingly simple to perform while achieving the highest degree of accuracy and also to provide an apparatus which is exceedingly simple and rugged while at the same time being highly effective in its performance.

The method and apparatus of the invention are capable of positioning with respect to each other a reference point on a first body in a first focal plane and a positioning point on a second body in a second focal plane which is parallel to the first focal plane. A first set of light rays are used with a suitable projecting structure to perform the step of projecting images of the reference point respectively onto the second body at the second focal plane and onto an observation point to be observed by the operator. Simultaneously, a second set of light rays are used with a second projecting structure to perform the step of projecting an image of the image of the reference point on the body at the second focal plane onto the observation point. In this way the operator may observe at the observation point both the image of the reference point and an image of the image of the reference point which has been projected onto the body at the second focal plane. Now at least one of the bodies is moved in its focal plane until the positioning point has a location coinciding with the image of the reference point at the body in the second focal plane.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
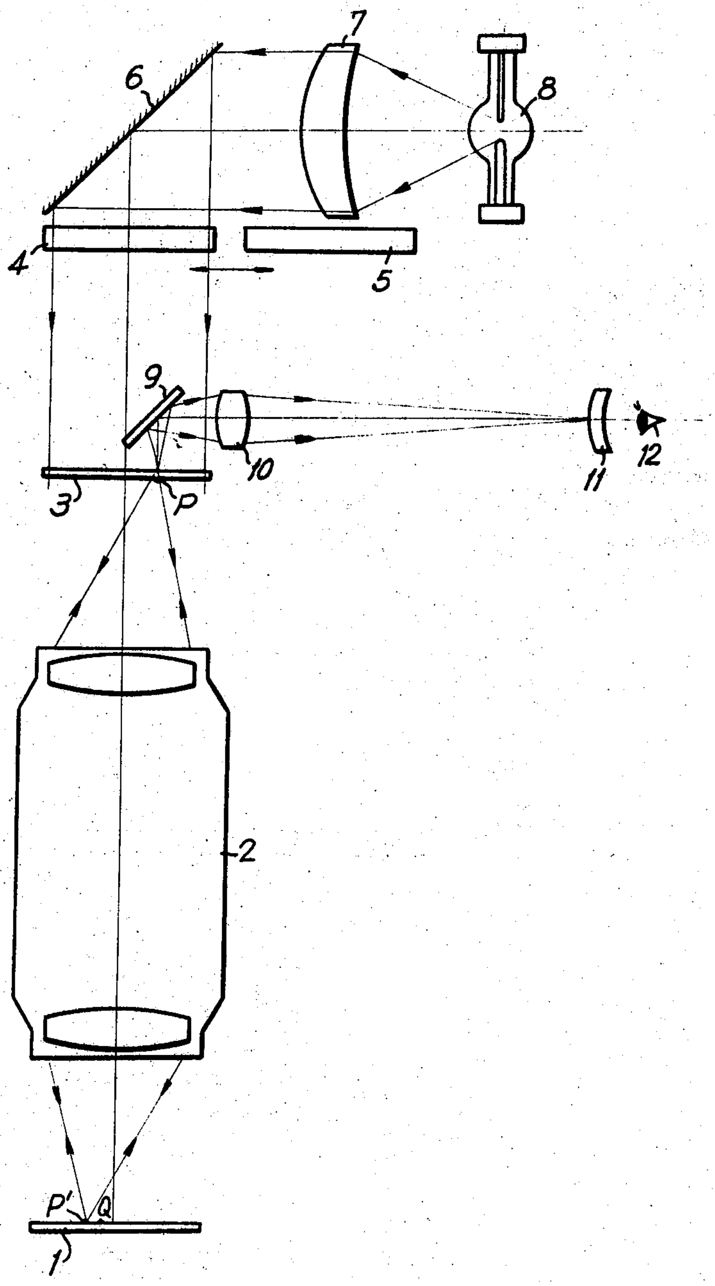
FIG. 1 is a schematic representation of a conventional method and apparatus for positioning bodies relative to each other.

Referring to FIG. 1, there is illustrated therein a projection exposure apparatus having a magnification of 1X and utilizing a lens which requires compensation with two wave lenths. FIG. 1 illustrates a body 1 in a focal plane and adapted to have a pattern printed thereon, this body being a wafer. The projecting means takes the form of a projector lens unit 2 having a magnification of 1X. FIG. 1 also illustrates a body 3 which is in the form of a mask consisting of a silver salt dry-plate or a chromium mask, and a minute pattern which is to be reproduced on the wafer 1 is recorded on the mask 3. Thus, the bodies 1 and 3 are respectively located in parallel focal planes which are normal to the optical axis of the projecting means 2. The first body 3 which is in the first focal plane has a reference point P, and the second body 1, which is in the second focal plane, has a positioning point Q. The optical projecting means 2 projects an image of the reference point P onto the body 1 to form thereon an image P' of the reference point P. The bodies 1 and 3 are properly positioned with respect to each other when the positioning point Q coincides with the image P' of the reference point P. The positioning point Q should coincide with the image P' within a given range of allowable error in order to provide proper positioning of the bodies 1 and 3 with respect to each other. Assuming that initially the positioning point Q does not coincide with the image P' of the reference point P, then either the body 3 or the body 1 will be displaced in its focal plane, or both of the bodies will be respectively displaced in their focal planes, until the positioning point Q is in coincidence with the image P' of the reference point P. Once the bodies are properly positioned in this way an exposure is made and an operating cycle is completed.

With the embodiment shown in FIG. 1 a filter 5 is provided to achieve light rays having a wave length which will be effectively sensed by the photo-resisting material which coats the wafer 1, while providing compensation of aberration as referred to above. A second filter 4 is provided for transmitting visual light rays also with aberration compensation as referred to above. The filters 4 and 5 are interchangeably inserted into the path of the light rays which travel through the body 3 and the projecting means 2 in order to reach the body 1. First the filter 4 is inserted in its operating position, as illustrated in FIG. 1, to enable the bodies 1 and 3 to be properly positioned with respect to each other, and then the filter 4 is replaced by the filter 5 so that an exposure will be made.

The mask 3 is placed in its position shown schematically in FIG. 1 and then the wafer 1 is set at least approximately in position. A light source 8 provides light rays which are transmitted through the condensor lens 7 and reflected by a reflector 6, so as to be directed first through the filter 4 and then through the filter 5, along the optical axis of the projecting means 2, the focal planes in which the bodies 1 and 3 are located being parallel to each other and normal to this optical axis. Thus, the light rays projected along the optical axis of the projector lens 2 will illuminate the wafer 1.

The light which is received by the wafer 1 is reflected back through the projecting means 2 onto the mask 3, the extent of reflection depending upon the particular pattern on the wafer 1, and this pattern is reflected back onto the mask 3 from which the pattern is initially projected to the wafer 1.

This light which is reflected back to the mask 3, passes through the latter and is received by a reflector 9, in the form of semi-transparent mirror through which the light from the source 8 travels. This reflector 9 is placed in the position shown in FIG. 1 only during positioning of the bodies 1 and 3 relative to each other. During exposure the reflector 9 is removed from the position shown in FIG. 1 so that it does not interfere with the travel of light during actual exposure of the body 1.

The light which is reflected by the reflector 9 is received by an objective 10 which focusses the reference point P as well as the reflected image thereof, suitably enlarged, to a location where the reflected enlarged image may be visually observed through the eyepiece 11. The visual observation at the eyepiece will assure that the image of the wafer 1 focussed on the mask 3 coincides with the pattern on the mask 3. The relative position of the mask 3 and the wafer 1 is then adjusted during observation at the eyepiece 11, and when the positioning point Q has been properly positioned with respect to the image P' of the point P, as observed by the operator at the eyepiece 11, an exposure is made after replacing the filter 4 with the filter 5, and of course after removing the reflector 9 so that none of the light rays are intercepted by the reflector 9.

With this system as described above in connection with FIG. 1, the degree of accuracy in the positioning depends upon the degree of resolution with respect to the wave length used for positioning purposes.

Figure 2:
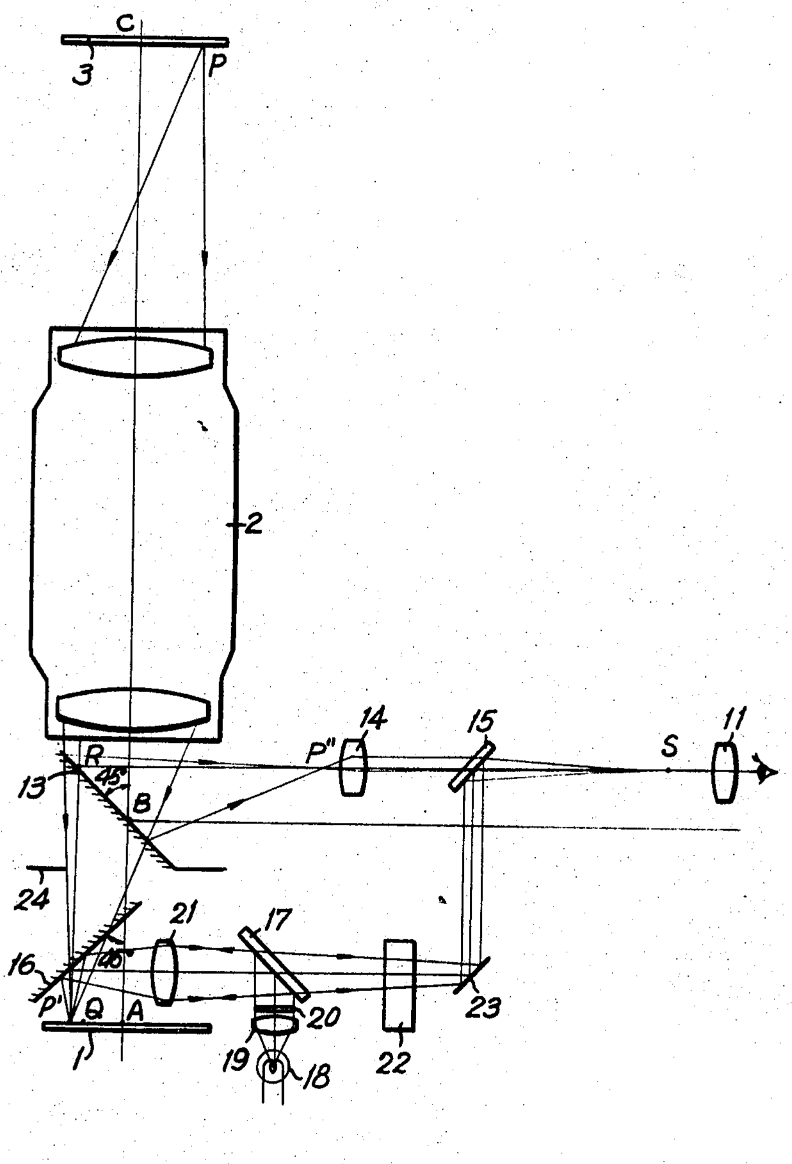
FIG. 2 is a schematic representation of the method and apparatus of the present invention.

FIG. 2 illustrates an apparatus of the invention for carrying out a positioning method according to the present invention. The illuminating structure is omitted from FIG. 2 for the sake of clarity. This structure may include, for example, the light source 8, the condensor lens 7, and the reflector 6 precisely as indicated in FIG. 1, but, as will be apparent from the description below, only one filter is required for aberration compensation, namely the filter corresponding to the filter 5 which is used during actual exposure. It is unnecessary with the method and apparatus of the invention to provide an additional compensation for visual observation.

FIG. 2 illustrates the optical axis AC of the optical means 2 which projects an image of the reference point P onto the body 1 which is in a focal plane normal to the optical axis AC. The body 3 is also in a focal plane normal to the optical axis, and these bodies 1 and 3 correspond to those described above in connection with FIG. 1. Thus, the optical means 2 will project the image P' of the reference point P onto the body 1 which has the positioning point Q. Thus, the light ray which illuminates the reference point P on the mask 3 is guided through the projector lens 2 and focusses the image point P' of the reference point P on the wafer 1. These light rays of the optical means 2 used at this time will be sensed by the photo-resisting material at the body 1. The aberration of the projector lens 2 is compensated within the range of the wave length of these light rays.

The illustrated structure includes a second optical means for providing a second image of the reference point P at an observation point S. This second optical means includes a semi-transparent reflector 13 situated at 45° across the optical axis AC between the optical means 2 and the wafer 1. The light rays which provide the first image P' of the reference point P are partially reflected by the semi-transparent reflector 13 to provide a second image P'' of the reference point P. This second image P'' of the reference point P is located along the line perpendicular to the optical axis AC and intersecting the reflecting surface 13 at the point R, the line P'R being parallel to the optical axis and having a length which is equal to the length of the line P''R. The second optical means which includes the semi-transparent reflector 13 also includes a relay lens 14 which provides an enlarged image of the point P'' at the observation point S. The image of the reference point P is focussed at the point P'' by the reflector 13 with a magnification of 1X. A third optical means is provided for situating at the observation point S an image of the image P'. This third optical means takes the form of a reflecting optical microscope of the incident light type, and this third optical means is situated with sufficient accuracy for enabling the point image P' to be viewed relative to the point P. The third optical means includes a light source 18 providing a second set of light rays which pass through the condensor lens 19 and then through a filter 20 before being reflected by the semi-transparent reflector 17 along a path intersecting the first set of light rays. The filter 20 provides safe light rays to which the photo-resisting material on the wafer 1 has no sensitivity, and these reflected "safe" light rays travel from the reflector 17 through an objective 21 and to a second reflecting surface 16 of a second reflector which is set at an angle of 45° across the optical axis AC. This second reflector 16 is also a semi-transparent reflector so that the first set of light rays travel through the reflector 16 to provide the first image P'. It will be noted that the reflecting surface 16 is perpendicular to the reflecting surface 13. Thus, the surface of the wafer 1 will be illuminated with the light from the source 18, and the light reflected from the wafer 1 will be reflected by the surface 16 back through the objective 21 and through the semi-transparent reflector 17 to refelectors 13 and 15 of the third optical means. The reflector 15 is also a semi-transparent reflector so that the second image P'' of the reference point P will be directed by the relay lens 14 through the semi-transparent reflector 15 to the observation point S. The third optical means also includes a reflector or a prism system 22 situated between the semi-transparent reflector 17 and the reflector 23 in order to prevent vertical or lateral inversion of the images which are superimposed at the observation point S. It is also possible to focus the images of the image point P' and P'' with a magnification of 1X into respective images at any appropriate observation point S by suitably designing the optical system.

Figure 3:
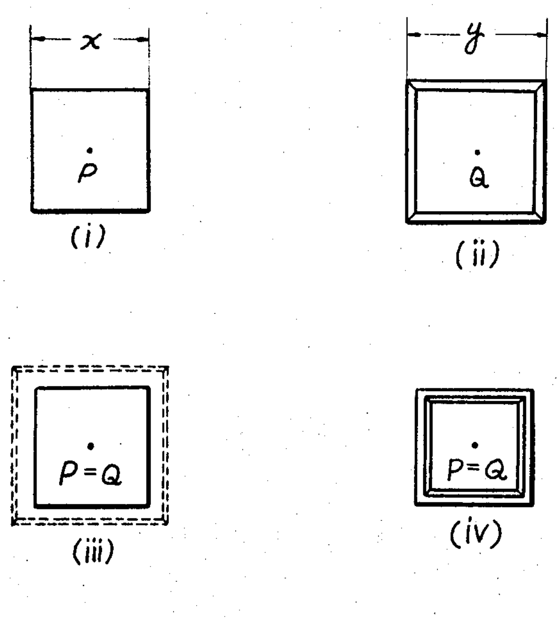
FIG. 3 is a diagrammatic representation of the manner in which different degrees of magnification are treated.

Of course, the magnification is not always required to be number 1X. Thus, referring to FIG. 3 it will be seen that the upper left pattern (i) on the mask 3 and the pattern (ii) on the wafer 1 will coincide if compensation is made for the relation where the sizes $x$ and $y$ of the mask and wafer, respectively, are different with the wafer having in this case a size greater than the mask. With such a relationship a magnification of 1X would create difficulties, as is apparent from the lower left illustration (iii) in FIG. 3. In this event the magnification of the objective is preferably smaller so as to facilitate the positioning to achieve the results shown at the lower right diagram (iv) of FIG. 3.

With the method and apparatus of the present invention the image P'' of the reference point P and the image of the image P'' of the reference point P coincide at the point S, and it is only required to enlarge these images by way of the eyepiece 11 in order to facilitate correct positioning of the bodies 1 and 3 realtive to each other. If the observation indicates that the positioning point Q does not coincide with the image P', then the wafer 1, for example, may be moved until the positioning point Q coincides with the image P' of the point P.

The above-described method and apparatus of the invention are of advantage in view of the fact that the first set of light rays traveling through the first optical means 2 and the second set of light rays provided by way of the third optical means which includes the filter 20 are of different colors, thus greatly facilitating the accuracy and ease of the positioning operation while permitting a selection of the light rays passing through the optical means 2, to which the photo-resisting material on wafer 1 is sensitive, to be selected in such a way that aberration compensation is only provided with respect to the wave length of the first set of light rays passing through the optical means 2.

In general when it is desired to determine whether positioning is properly achieved over the entire area by observing a portion smaller than 0.1 mm $\phi$ of a larger area having a magnitude of, for example, 50 mm $\phi$, it is only required to assure the desired coincidence of two spaced points. This result is easily accomplished by providing a pair of structures as shown in FIG. 2, and it is also possible for convenience of viewing to provide a pair of double images divided into a single view for eyepieces used in an apparatus of the conventional two-view field type. The so-called mechanical back of the projector lens must be sufficiently long to effect the positioning in the manner as mentioned above. The light rays transmitted by the optical means 2 during the positioning operation are indeed sensed by the photo-resisting material, and during the positioning operation a screening means 24 is provided, in the form of suitable light-intercepting plate, so that undesired portions of the light rays, not required for positioning, are prevented from reaching the wafer 1 during the positioning operation. Naturally when an exposure is made all components which are in the viewing field during the positioning operations are suitably retracted out of the viewing field, just prior to actual exposure.

Figure 4:
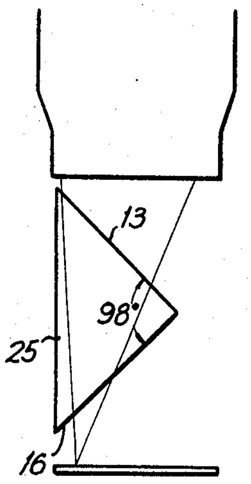
FIG. 4 is a fragmentary schematic illustration of an embodiment different from that of FIG. 2.

Although the second and third optical means of FIG. 2 are respectively provided with separate reflecting surfaces 13 and 16 of a pair of separate semi-transparent reflectors, it is possible to provide an embodiment as shown in FIG. 4 where the reflecting surfaces 13 and 16 form mutually perpendicular surfaces of a common prism 25.

The above described method and apparatus of the invention may also be used in the case where the magnification of the projector lens which forms the optical means 2 is different from 1X. In this case the magnification and the focal length of the relay lens 14 and the objective 21, respectively, may be selected according to the magnification of the projector lens 2 in such a way that the entire optical system will be designed to effectively locate the images transmitted by the relay lens 14 and the objective 21 at the common observation point S.

It is apparent, therefore, that with the method and apparatus of the invention as described above, not only is the structure of the projecting lens advantageously simplified, but in addition positioning accuracy is achieved in a highly convenient manner since the mask and wafer are viewed at least in two colors during the positioning operations, as contrasted with conventional systems.

What is claimed is:

1. In a method for positioning with respect to each other a reference point on a first body in a first focal plane and a positioning point on a second body in a second focal plane which is parallel to said first focal plane, the steps of projecting with a first set of light rays images of said reference point respectively onto said second body at said second focal plane and onto an observation point to be observed by the operator, simultaneously projecting with a second set of light rays an image of the image of said reference point on said body at said second focal plane onto said observation point, so that the operator may observe at said observation point both the image of said reference point and an image of the image of said reference point which is projected onto said body at said second focal plane, and moving at least one of said bodies in its focal plane until sid positioning point has a location coinciding with the image of said reference point at said body in said second focal plane.

2. In a method as recited in claim 1 and wherein said first set of light rays project the image of said reference point along a predetermined optical axis which is normal to said focal planes, said step of projecting images of said reference point onto said body at said second focal plane and to said observation point including the step of positioning at 45° to said optical axis a semi-transparent reflecting surface through which an image of said reference point is projected onto said body at said second focal plane and by which an image of said reference point is reflected perpendicularly with respect to said optical axis toward said observation point.

3. In a method as recited in claim 2 and wherein said reflecting surface initially locates an image of said reference point at a location which is spaced from said reflecting surface along a line perpendicular to the optical axis by a distance equal to the distance between a point where said line intersects said surface and said second focal plane to which said image of said reference point is projected in a direction parallel to the optical axis.

4. In a method as recited in claim 3 and wherein said step of projecting an image of said reference point to said observation point includes the step of further projecting an image of said reference point at said location along said line perpendicular to the optical axis further away from the optical axis to said observation point.

5. In a method as recited in claim 1 and wherein a pattern on said body at said first focal plane is to be reproduced on said body at said second focal plane, said body at said second focal plane being sensitive to said first set of light rays and insensitive to said second set of light rays, and screening said first set of light rays so that only a small fraction of the area of said body at said second focal plane is engaged by said first set of light rays during the positioning of said bodies one with respect to the other.

6. In a method as recited in claim 1 and wherein said first set of light rays project the images of said reference point along an optical axis which is perpendicular to said focal planes, said step of projecting an image of said reference point to said observation point including the step of positioning across said optical axis a first semi-transparent reflecting surface which makes an angle of 45° with respect to said optical axis, and the step of projecting an image of the image of said reference point at said second focal plane onto said observation point including the step of positioning across the optical axis a second semi-transparent reflecting surface which makes an angle of 45° with respect to the optical axis and which is perpendicular to the first semi-transparent reflecting surface.

7. In a method as recited in claim 6 and wherein said body at said second focal plane is sensitive to said first set of light rays and insensitive to said second set of light rays, said body at said second focal plane being adapted to have reproduced thereon a pattern on the body at said first focal plane, screening said first set of light rays except for a small portion thereof which engage said body at said second focal plane at a relatively small area during positioning of said bodies one with respect to the other, and after said bodies are positioned one with respect to the other by locating said positioning point in coincidence with said image of said reference point at said body in said second focal plane, exposing said body at said second focal plane to said first set of light rays afer eliminating the screening of the first set of light rays to an extent sufficient to expose said body at said second focal plane thereto and after retracting out of the path of said first set of light rays all components which might otherwise interfere with exposure of said body at said second focal plane to said first set of light rays.

8. In a method as recited in claim 1, said second set of light rays having a color different from said first set of light rays.

9. In an apparatus for positioning with respect to each other a reference point on a body in a first focal plane and a positioning point on a body in a second focal plane which is parallel to said first focal plane, first optical means for projecting along a predetermined optical axis perpendicular to said focal planes a first image of said reference point onto said body at said second focal plane, second optical means for projecting a second image of said reference point perpendicularly from said optical axis onto a predetermined observation point, and third optical means for projecting an image of said first image to said observation point into coincidence with said second image, so that by moving one of said bodies in its focal plane relative to the other of said bodies until said positioning point coincides with said first image, as observed by the coinciding images at said observation point, said bodies may be properly positioned relative to each other.

10. The combination of claim 9 and wherein said second and third optical means respectively include semi-transparent reflecting surfaces which are perpendicular to each other and which extend at 45° across the optical axis.

11. The combination of claim 10 and wherein said reflecting surfaces respectively form parts of a pair of said separate reflectors.

12. The combination of claim 10 and wherein said reflecting surfaces respectively are reflecting surfaces of a common prism.

* * * * *

UNITED STATES PATENT OFFICE
CERTIFICATE OF CORRECTION

Patent No. 3,751,170 Dated August 7, 1973

Inventor(s) HIDAKA, TSUNEO

It is certified that error appears in the above-identified patent and that said Letters Patent are hereby corrected as shown below:

In the drawings, sheet 3, Fig. 4, "98°" should read --90°--.

Signed and sealed this 10th day of September 1974.

(SEAL)
Attest:

McCOY M. GIBSON, JR.
Attesting Officer

C. MARSHALL DANN
Commissioner of Patents